Patented June 6, 1939

2,160,904

UNITED STATES PATENT OFFICE 2,160,904

PLASTIC DERIVATIVES OF VINYLIDENE CHLORIDE

John H. Reilly and Ralph M. Wiley, Midland, Mich., assignors to The Dow Chemical Company, Midland, Mich., a corporation of Michigan No Drawing. Application October 12, 1937, Serial No. 168,626

6 Claims. (Cl. 260—36)

This invention concerns certain plasticized polymeric vinylidene chloride products.

In our co-pending applications Serial No. 33,126, filed July 25, 1935, of which this application is a continuation-in-part, and Serial No. 168,200, filed October 9, 1937, we have described the properties of the polymers produced from monomeric vinylidene chloride having a boiling point at 31.5°–32° C. under 760 millimeters pressure and a specific gravity of 1.22 at 15°/4° C. When this material is polymerized it yields a product which is only sparingly soluble in boiling tetrachloroethane and which is insoluble in chloroform, carbon tetrachloride, ethylene bromide, and benzene. The polymer is substantially unchanged in composition when heated in a glass container to 180° C. for one hour. The polymer may be obtained in a variety of physical forms, e. g. gel-like mass, soft porous powder, or hard, bone-like material, depending on the extent of polymerization. Regardless of the physical form in which it is obtained polymerized pure vinylidene chloride is resistant to thermal decomposition at temperatures as much as 15 to 30 centigrade degrees above the softening point of said polymer which is ordinarily between about 170° and 200° C. The polymer is exceptionally resistant to chemical attack by acids, bases, and oxidizing agents.

The above described polymeric vinylidene chloride can be molded, extruded, or drawn into desirable shapes only with difficulty at temperatures below its softening point, i. e. about 170° C. or higher. When such a polymer is heat-treated, its toughness is increased somewhat, but not to the extent ordinarily desired. It is desirable to modify the plastic properties of such a polymer so as to permit of deformation thereof at moderate temperatures and at readily obtained working pressures. It is also desirable to modify the properties of such a polymer so as to permit of a substantial increase in tensile strength and toughness following heat-treating operations.

It is accordingly an object of the present invention to provide a plastic composition comprising polymeric pure vinylidene chloride which may be worked at moderate temperatures and which may be plastically deformed at or about room temperatures. It is a further object to provide such a composition which, when heat-treated, becomes tough and has a substantially increased tensile strength.

We have now found that the foregoing objects may be readily attained by incorporating in the polymeric pure vinylidene chloride a plasticizing agent such as chlorinated diphenyl oxide, chlorinated diphenyl, poly-chloro-benzene, chlorinated naphthalene, and the like, all of which are compatible with the polymer. Other plasticizers such as butyl phthalate, penta-chloroethane, hexa-chloroethane, and camphor may be employed but somewhat less advantageously, owing to the fact that they are only slightly compatible with the highly insoluble forms of poly-vinylidene chloride. The plasticizing agent to be employed may be incorporated in the polymer by dissolving the plasticizer in monomeric vinylidene chloride prior to polymerization or it may conveniently be added to the polymeric material by grinding, mixing, milling, or by incorporation on hot rolls such as are employed in rubber compounding.

The plasticizers which we prefer to employ are the chlorinated diphenyl oxides and chlorinated diphenyls, and more particularly such compounds containing from 3 to 6 chlorine atoms per molecule. The lower chlorinated derivatives of diphenyl oxide and diphenyl are for some purposes too volatile to be satisfactorily employed, while those compounds containing more than about 6 chlorine atoms per molecule tend to crystallize, even when incorporated in the plastic, and do not serve their desired function.

The following examples illustrate the practice of our invention but are not to be construed as limiting the same:

Example 1

800 grams of monomeric vinylidene chloride boiling at 31.8° C., 200 grams of hexa-chloro-diphenyl oxide, and 2.5 grams of benzoyl peroxide were polymerized at 30° C. under a half-inch layer of distilled water for 18 days. The product, a solid cake, was removed, dried in an oven at 100° C. for 3 hours to remove a small amount of water and monomeric vinylidene chloride, and cut into bars which were molded in steel dies at 160° C. under pressure of 15,000 pounds per square inch. A standard A. S. T. M. test bar molded in this fashion gave a tensile strength of 4,700 pounds per square inch. A duplicate test bar, after molding, was toughened and heat-treated at 185° C. in glycerine for 3 minutes and remolded in the steel die at 160° C. This bar was stressed to a load of 5,600 pounds per square inch at which load the specimen deformed and pulled through the specimen holder without breaking.

Another bar was molded at 180° C. into a cylindrical specimen, 3 inches long and 0.25 inch in diameter. This specimen showed a tensile strength of 7,500 pounds per square inch and elongation of about 200 per cent.

A non-plasticized test bar of polymeric pure vinylidene chloride, molded at about 180° C. under pressure of approximately 15,000 pounds per square inch, had a tensile strength of approximately 3,500 pounds per square inch.

Example 2

130 grams of finely powdered poly-vinylidene chloride, prepared by allowing pure monomeric vinylidene chloride to stand exposed to air and ordinary laboratory lighting conditions, was washed on a Buchner filter with several times its volume of acetone and dried for 30 minutes at 60° C. A clear, colorless solution of 70 grams of tetrachloro-diphenyl oxide in 200 cc. of acetone was then poured slowly over the polymer with constant stirring and mastication. The acetone was then removed at 60° C. This mixture could then be molded to very strong, nearly transparent articles, or heat treated and toughened as desired. Depending on the amount of flow desired, molding temperatures could be varied from 150° to 220° C.; the strength and toughness of the articles depending on the amount and type of heat treatment given. The product could be deformed by rolling or drawing, even at room temperature.

The incorporation in polymeric vinylidene chloride of up to 35 per cent by weight of one of the preferred plasticizers has been found to have no material influence upon the inherent solvent resistance of the polymer. To illustrate, a resin containing 35 per cent of hexa-chloro-diphenyl oxide was placed in boiling tetrachloroethane (in which the hexa-chloro-diphenyl oxide is completely soluble) for 3 hours with only a slight swelling of the specimen and a 5 per cent increase in weight. The plasticizer, then, is intimately bound in the polymer and cannot be readily extracted therefrom.

The invention has been illustrated principally with respect to poly-chloro-diphenyl oxides as plasticizers but other materials of the type hereinbefore enumerated may be as readily employed with similar advantageous results. The amount of plasticizer to be incorporated in the polymer may vary through wide limits depending upon the properties desired and upon the compatibility of the plasticizer and the polymer. For most purposes an amount of plasticizer ranging from 5 to 45 per cent, based on the weight of the plasticized composition, is satisfactory.

Other modes of applying the principle of our invention may be employed instead of those explained, change being made as regards the materials employed, provided the ingredients stated by any of the following claims, or the equivalent of such stated ingredients be employed.

We therefore particularly point out and distinctly claim as our invention:

1. A composition comprising polymeric vinylidene chloride prepared from monomeric vinylidene chloride having a boiling point between 31.5° and 32° C., plasticized with between 5 and about 45 per cent, based on the weight of plasticized composition, of a material selected from the group consisting of chlorinated diphenyl oxides, chlorinated diphenyls, each of the foregoing containing between about 3 and about 6 chlorine atoms per molecule, chloro-naphthalenes, and poly-chloro-benzenes, to increase the workability of the polymer at low temperatures and to increase toughness and strength thereof when subjected to heat-treatment.

2. A composition comprising polymeric vinylidene chloride prepared from monomeric vinylidene chloride having a boiling point between 31.5° and 32° C., plasticized with between 5 and about 45 per cent, based on the weight of plasticized composition, of chlorinated diphenyl oxide containing between about 3 and about 6 chlorine atoms per molecule, to increase the workability of the polymer at low temperatures and to increase toughness and strength thereof when subjected to heat-treatment.

3. A composition comprising polymeric vinylidene chloride prepared from monomeric vinylidene chloride having a boiling point between 31.5° and 32° C., plasticized with between 5 and about 45 per cent, based on the weight of plasticized composition, of hexachloro-diphenyl oxide, to increase the workability of the polymer at low temperatures and to increase toughness and strength thereof when subjected to heat-treatment.

4. The process which comprises dissolving a plasticizer selected from the group consisting of chlorinated diphenyl oxides, chlorinated diphenyls, each of the foregoing containing between about 3 and about 6 chlorine atoms per molecule, poly-chloro-benzenes and chloro-naphthalenes, in monomeric vinylidene chloride having a boiling point between 31.5° and 32° C., and subjecting the mixture to polymerizing conditions.

5. The process which comprises dissolving a chlorinated diphenyl oxide containing from 3 to 6 chlorine atoms per molecule in monomeric vinylidene chloride having a boiling point between 31.5° and 32° C., and subjecting the mixture to polymerizing conditions.

6. The process which comprises dissolving hexachloro-diphenyl oxide in monomeric vinylidene chloride having a boiling point between 31.5° and 32° C., and subjecting the mixture to polymerizing conditions.

JOHN H. REILLY.
RALPH M. WILEY.